United States Patent
Murarka

(10) Patent No.: US 9,098,686 B2
(45) Date of Patent: Aug. 4, 2015

(54) SOCIAL AUTHENTICATION

(71) Applicant: Neel Ishwar Murarka, Menlo Park, CA (US)

(72) Inventor: Neel Ishwar Murarka, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/689,912

(22) Filed: Nov. 30, 2012

(65) Prior Publication Data

US 2014/0157379 A1 Jun. 5, 2014

(51) Int. Cl.
*G06F 7/04* (2006.01)
*G06F 21/31* (2013.01)
*G06Q 50/00* (2012.01)

(52) U.S. Cl.
CPC .............. *G06F 21/31* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2008/0148366 A1* | 6/2008 | Wahl | 726/4 |
| 2009/0198562 A1* | 8/2009 | Wiesinger et al. | 705/10 |
| 2010/0229223 A1* | 9/2010 | Shepard et al. | 726/5 |
| 2011/0182485 A1* | 7/2011 | Shochat et al. | 382/118 |
| 2012/0011432 A1* | 1/2012 | Strutton | 715/234 |
| 2012/0214442 A1* | 8/2012 | Crawford et al. | 455/411 |
| 2013/0019278 A1* | 1/2013 | Sun et al. | 726/2 |
| 2013/0031208 A1* | 1/2013 | Linton et al. | 709/217 |
| 2013/0246454 A1* | 9/2013 | Menten | 707/769 |
| 2013/0262459 A1* | 10/2013 | Srikrishna et al. | 707/732 |
| 2013/0262588 A1* | 10/2013 | Barak et al. | 709/204 |
| 2014/0068654 A1* | 3/2014 | Marlow et al. | 725/28 |

FOREIGN PATENT DOCUMENTS

| | | |
|---|---|---|
| JP | 2008-250911 A | 10/2008 |
| JP | 2009-110432 A | 5/2009 |

OTHER PUBLICATIONS

International Search Report and Written Opinion for International Application PCT/US2013/071707, Mar. 13, 2014.

* cited by examiner

*Primary Examiner* — Shewaye Gelagay
*Assistant Examiner* — Khoi Le
(74) *Attorney, Agent, or Firm* — Baker Botts L.L.P.

(57) ABSTRACT

In one embodiment, a method includes providing for presentation to a user a number of content objects. Some of the content objects are socially relevant to the user and some of the content objects are socially irrelevant to the user. The method also includes receiving input indicating a selection of one of the content objects by the user; determining whether the content object selected by the user is socially relevant to the user; authenticating the user if the content object selected by the user is socially relevant to the user; and declining to authenticate the user if the content object selected by the user is socially irrelevant to the user.

16 Claims, 7 Drawing Sheets

SOCIAL AUTHENTICATION

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the user may be authenticated based on information associated with the social graph of the user. In particular embodiments, the user may select or tap on one or more profile photos of friends from among a facepile that also includes photos of random users, displayed on the mobile device or web browser. Other examples of social authentication may be selecting one or more status updates made by the user from a set of random status updates, selecting check-in locations posted by the user, selecting photos uploaded by the user, selecting communities or groups of the user, etc. or any combination of these. In particular embodiments, the user may gain access to the social network through a web browser or unlock a mobile device based on the authentication.

DESCRIPTION OF EXAMPLE EMBODIMENTS

Figure 1:
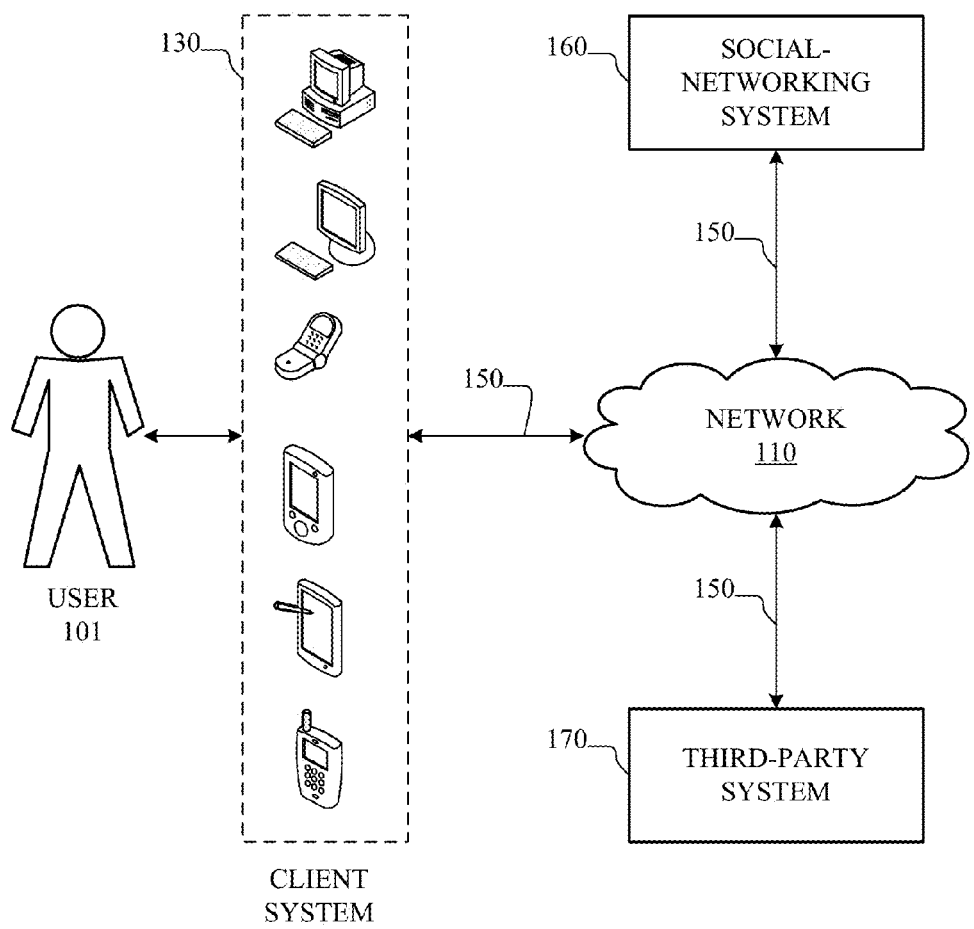
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160.

Social-networking system 160 may prevent unauthorized usage of social-networking system 160 or third-party system 170 by authenticating users of social-networking system 160 or third-party system 170. In particular embodiments, user 101 may be authenticated based at least in part on the user selecting content objects that are socially relevant or socially irrelevant to user 101, described below. Herein, reference to social relevant content objects may encompass any suitable content object associated with user 101 or another user with a relationship with user 101 as described below. As an example and not by way of limitation, social-networking system 160 or third-party system 170 may select a group of content objects and send data corresponding to the group of content objects to client system 130. Moreover, social-networking system may select one or more of the content objects for the group that are socially relevant to user 101 and one or more of the content objects for the group are socially irrelevant to user 101 based at least in part on social-graph information associated with user 101. As an example and not by way of limitation, user 101 may be authenticated based at least in part on selecting the content objects that are socially relevant to user 101 from among a group of content objects. As another example, user 101 may be authenticated based at least in part on selecting the content objects that are socially irrelevant to user 101 from among a group of content objects.

The authorization server of social-networking system 160 may be used to enforce one or more privacy settings of the users of social-networking system 160. A privacy setting of a user determines how particular information or content objects associated with the user can be shared. In particular embodiments, the selection of the content objects by social-networking system 160 for authenticating users may constrained by the privacy settings of the users of social-networking system 160. As an example and not by way of limitation, social-networking system 160 may restrict selection of content objects to content objects set for public sharing.

Client system 130 may be any suitable computing device, such as, for example, a personal computer, a laptop computer, a cellular telephone, a smartphone, or a tablet computer. As described below, a display associated with client system 130 may be locked and user 101 denied access to one or more functionality of client system 130 for security reasons as well as to save power. As an example and not by way of limitation, when client system 130 has not been used for a pre-determined period of time, client system 130 may automatically enter into a power-saving mode that darkens the display to save power and blocks interaction with client system 130 to prevent unauthorized usage or accidental input. In particular embodiments, some users may choose to protect client system 130 from unauthorized usage and authenticate user 101 by requiring security codes to unlock client system 130 in order to interact with client system 130, while other users may not. In particular embodiments, user 101 may be authenticated and client system 130 unlocked based at least in part on user 101 selecting one or more content objects socially relevant or one or more content objects socially irrelevant to user 101, as described below.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2A:
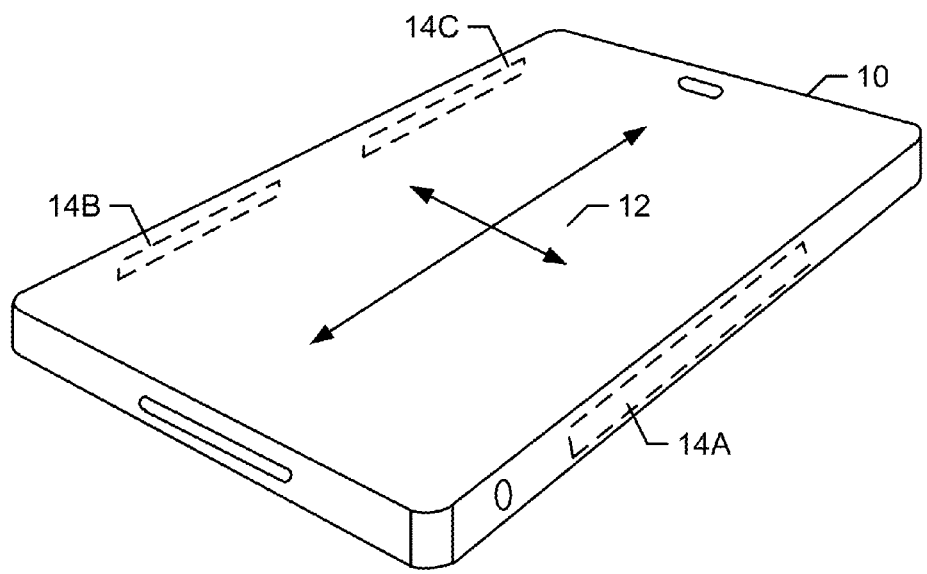
FIG. 2A illustrates an example mobile device.

FIG. 2A illustrates an example mobile device. In particular embodiments, the client system may be a mobile device 10 as described above. This disclosure contemplates mobile device 10 taking any suitable physical form. In particular embodiments, mobile device 10 may be a computing system as described below. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch sensor 12 as an input component. In the example of FIG. 2, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 2, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile device many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile device 10 may include any suitable communication component for any of these networks, where appropriate.

As described above, the user may be authenticated based at least in part on the user selecting one or more content objects that are socially relevant or one or more content objects that are socially irrelevant to the user. In particular embodiments, mobile device 10 may be locked preventing interaction with mobile device 10. Alternatively, a user of mobile device 10 may manually lock mobile device 10 by, for example, pushing a preset key or button or performing a predefined gesture detected by the touch sensor of mobile device 10. As described above, authentication of the user and unlocking mobile device 10 may be performed based at least in part on the user selecting content objects socially relevant or selecting content objects socially irrelevant to the user based at least in part on social-graph information associated with the user. As an example and not by way of limitation, content objects may include images, videos, audios, feeds, photo albums, posts, check-in locations, or messages. Although this disclosure describes authentication of the user through particular client systems, this disclosure contemplates authentication the user through any suitable client system, such as for example, a personal computer or tablet computer.

As described above, mobile device 10 may communicate with a social-networking system through a wired or wireless network. In particular embodiments, mobile device 10 may receive data corresponding to a group of content objects from the social-networking system through a communication network. In particular embodiments, upon powering up, mobile device 10 may communicate with the social-networking system or third-party system and dynamically request a group of content objects stored on the social-networking system. As described above, one or more of the content objects in the group are socially relevant to the user based at least in part on social-graph information associated with the user, such as for example, a name or a profile photo of another user having a "friend" relationship to the user. One or more of the content objects in group are socially irrelevant to the user based at least in part on the social-graph information, such as for example, a profile photo of another user with no relationship with the user. In particular embodiments, the content objects corresponding to the data received from the social-networking system may be presented on the display of mobile device 10.

Figure 2B:
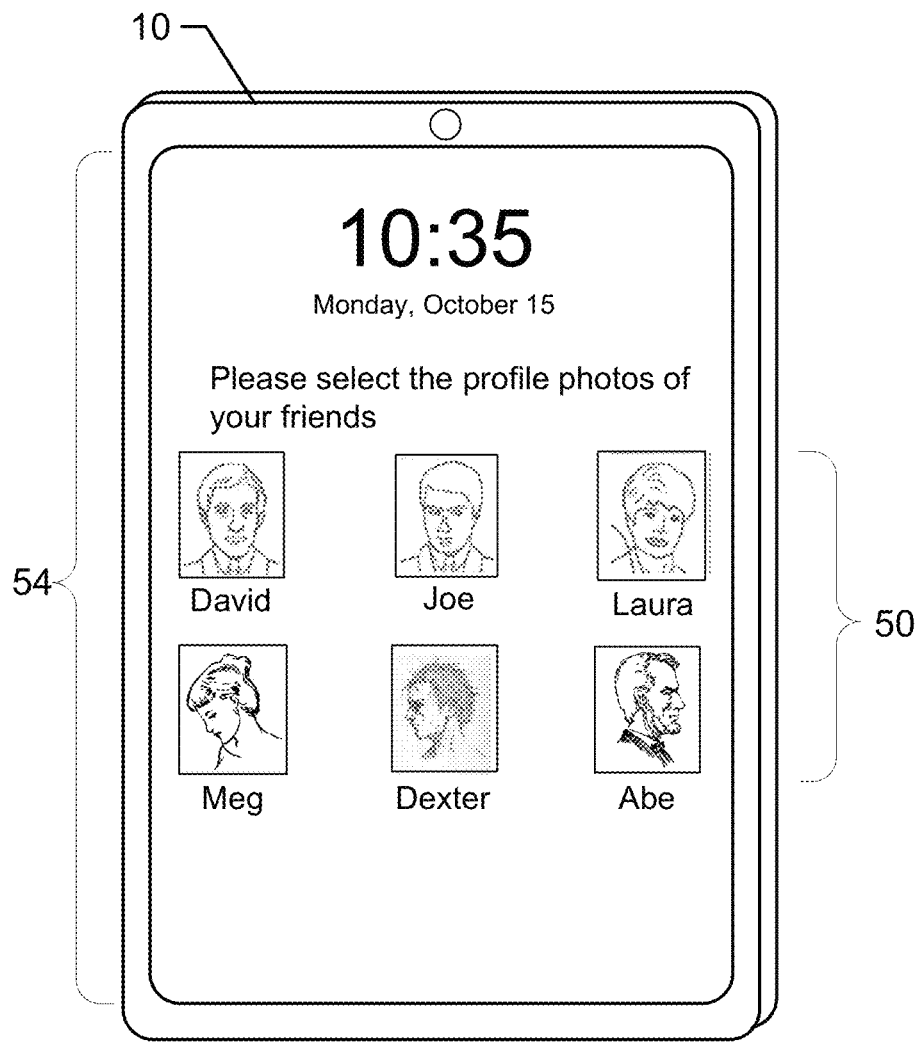
FIG. 2B illustrates an example wireframe of an example social authentication view.

FIG. 2B illustrates an example wireframe of an example social authentication view. In particular embodiments, the user may be requested to select one or more content objects socially relevant to the user from the content objects that are socially irrelevant to the user. As an example and not by way of limitation, the user may be requested to select one or more content objects socially relevant to the user from the group of displayed content objects, such as for example a photo (e.g. as a "facepile" 50) or status update, posted by the user. As another example, the user may be requested to select one or more content objects socially irrelevant to the user from the group of displayed content objects, such as for example a photo or status update, posted by the user. The socially irrelevant content objects may be associated with another user that does not have a relationship with the user or may be content objects chosen at random by the social-networking system. In particular embodiments, the user may be requested to select one or more content objects socially irrelevant to the user from the content objects that are socially relevant to the user. In the example of FIG. 2B, a facepile 50 of profile pictures is displayed in a display area 54 of mobile device 10. Although this disclosure illustrates and describes display of content objects in a display area of a particular number of pages, this disclosure contemplates display of content objects in the display area of any suitable number of pages. Furthermore, although this disclosure describes authentication of the user through particular content objects socially relevant to the user, this disclosure contemplates authentication the user through any suitable content object that is socially relevant to the user, such as for example, a name of another user, profile photos of another user, status updates, photos uploaded by the user, check-in locations posted by the user, video uploaded by the user, communities or groups associated with the user, or any combination thereof. In particular embodiments, if mobile device 10 has accessed content objects from the social-networking system within a pre-determined amount of time (e.g. within ten minutes), then mobile device 10 may use the content objects previously received from the social-networking system.

In particular embodiments, mobile device 10 may determine whether one or more of the content objects selected by the user are socially relevant to the user. In other particular embodiments, mobile device 10 may determine whether one or more of the content objects selected by the user are socially irrelevant to the user. The user may provide input (e.g. tapping on the display of mobile device 10) to select one or more of the displayed content objects. As an example and not by way of limitation, the user may be prompted to select one or more profile photos displayed in the facepile 50 that are social relevant to the user (i.e. are a "friend" of the user). As described above, data indicating the selection by the user of one or more of the displayed content objects may be sent to the social-networking system or third-party system. The social-networking system may determine whether the selection corresponds to the content objects associated with the user based on social-graph information. As described above, mobile device 10 may receive data indicating whether the selected content object is socially relevant or socially irrelevant to the user. In particular embodiments, authentication of the user by mobile device 10 may be based at least in part on the indication from the social-networking system that the content object selected by the user is socially relevant to the user. As an example and not by way of limitation, the social-networking system may provide an indication to mobile device 10 that one of more profile photos of facepile 50 selected by the user is a "friend" of the user. Although this disclosure describes a particular computing system determining whether the content object selected by the user is socially relevant, this disclosure contemplates determining whether the content object selected by the user is socially relevant being performed by any suitable computing system, such as for example, a third-party system or a client computing system.

In particular embodiments, the user may access one or more functionalities of mobile device 10 based at least in part on the authentication by the social-networking system, as described above. As an example and not by way of limitation, the display of mobile device may present an application launcher and the user may interact with mobile device 10 through the touch sensor based on the authentication. In particular embodiments, the user may access the social-networking system based at least in part on the authentication. As an example and not by way of limitation, the user may access the social-networking system using a web browser executed on mobile device 10. As described above, the social-networking system may prevent unauthorized usage by requiring the user to perform the authentication procedure, as described above. As an example and not by way of limitation, when accessing the social-networking system through a web browser executed on mobile device 10, a list of status updates may displayed on the web browser. Access to the social-networking system may be provided based at least in part on the user correctly selecting the status updates socially relevant to the user from among the status updates displayed on the web browser.

Figure 3:
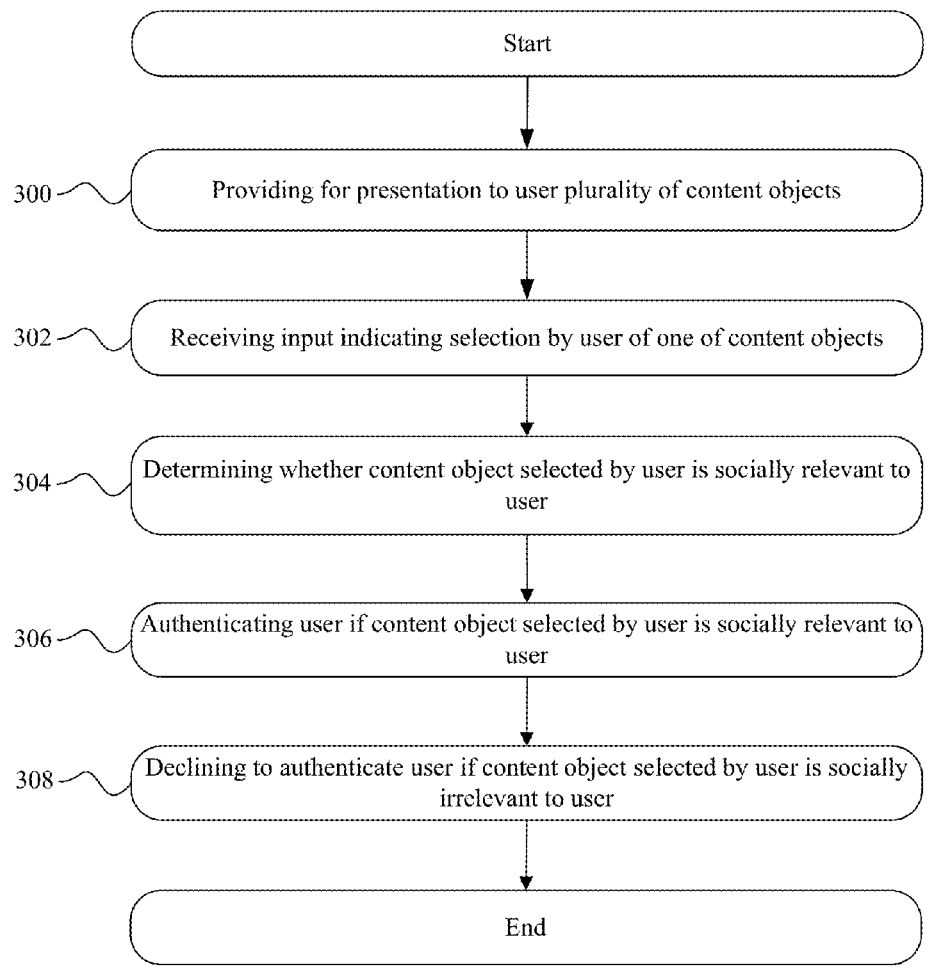
FIG. 3 illustrates an example method for authenticating a user based on content objects socially relevant to the user.

FIG. 3 illustrates an example method for authentication based on a user selecting content objects socially relevant to the user. The method may start at step 300, where a computing device provides for presentation to a user a plurality of content objects. In particular embodiments, one or more of the content objects are socially relevant to the user based at least in part on social-graph information associated with the user. In particular embodiments, one or more of the content objects are socially irrelevant to the user. At step 302, the computing device receives input indicating a selection by the user of one of the content objects. Step 304 determines whether the content object selected by the user is socially relevant to the user. Step 306 authenticates the user if the content object selected by the user is socially relevant to the user. At step 308, the computing device declines to authenticate the user if the content object selected by the user is socially irrelevant to the user, at which point the method may end. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
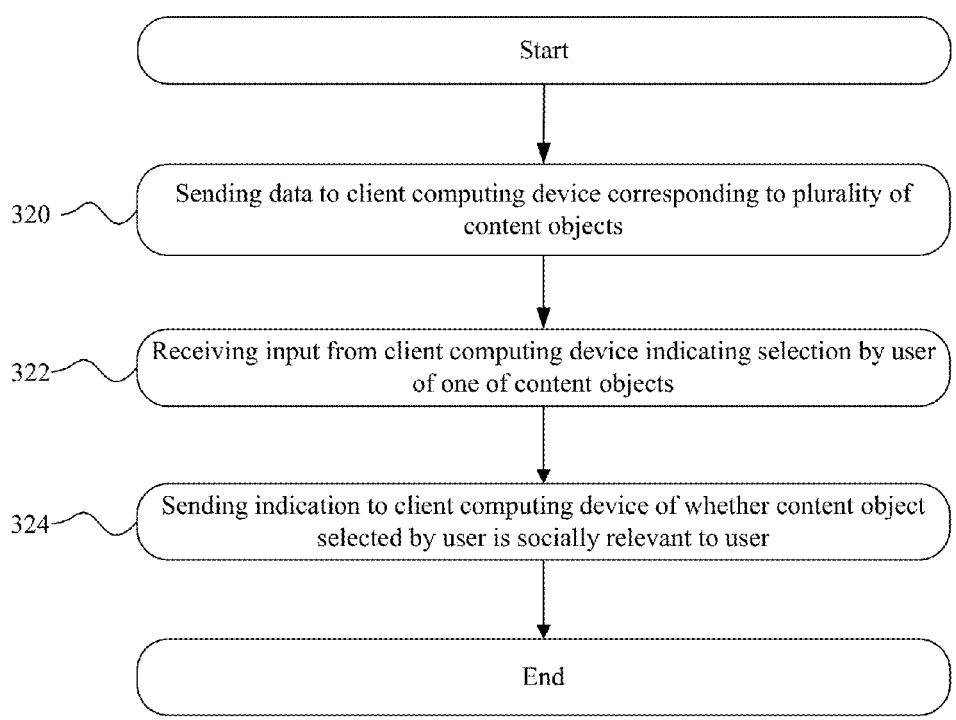
FIG. 4 illustrates an example method for authenticating a user based on content objects socially relevant to the user provided by a server computing device.

FIG. 4 illustrates an example method for authentication based on a user selecting content objects socially relevant to the user provided by a server computing device. The method may start at step 320, where a server computing device sends data to a client computing device corresponding to a plurality of content objects. In particular embodiments, one or more of the content objects are socially relevant to the user based at least in part on social-graph information associated with the user. In particular embodiments, one or more of the content objects are socially irrelevant to the user. Step 322 receives input from the client computing device indicating a selection by the user of one or more of the content objects. At step 324, the server computing device sends an indication to the client computing device of whether the content objects selected by the user are socially relevant to the user, at which point the method may end. In particular embodiments, the user is authenticated by the client computing device based at least in part on whether the content object selected by the user is socially relevant to the user. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
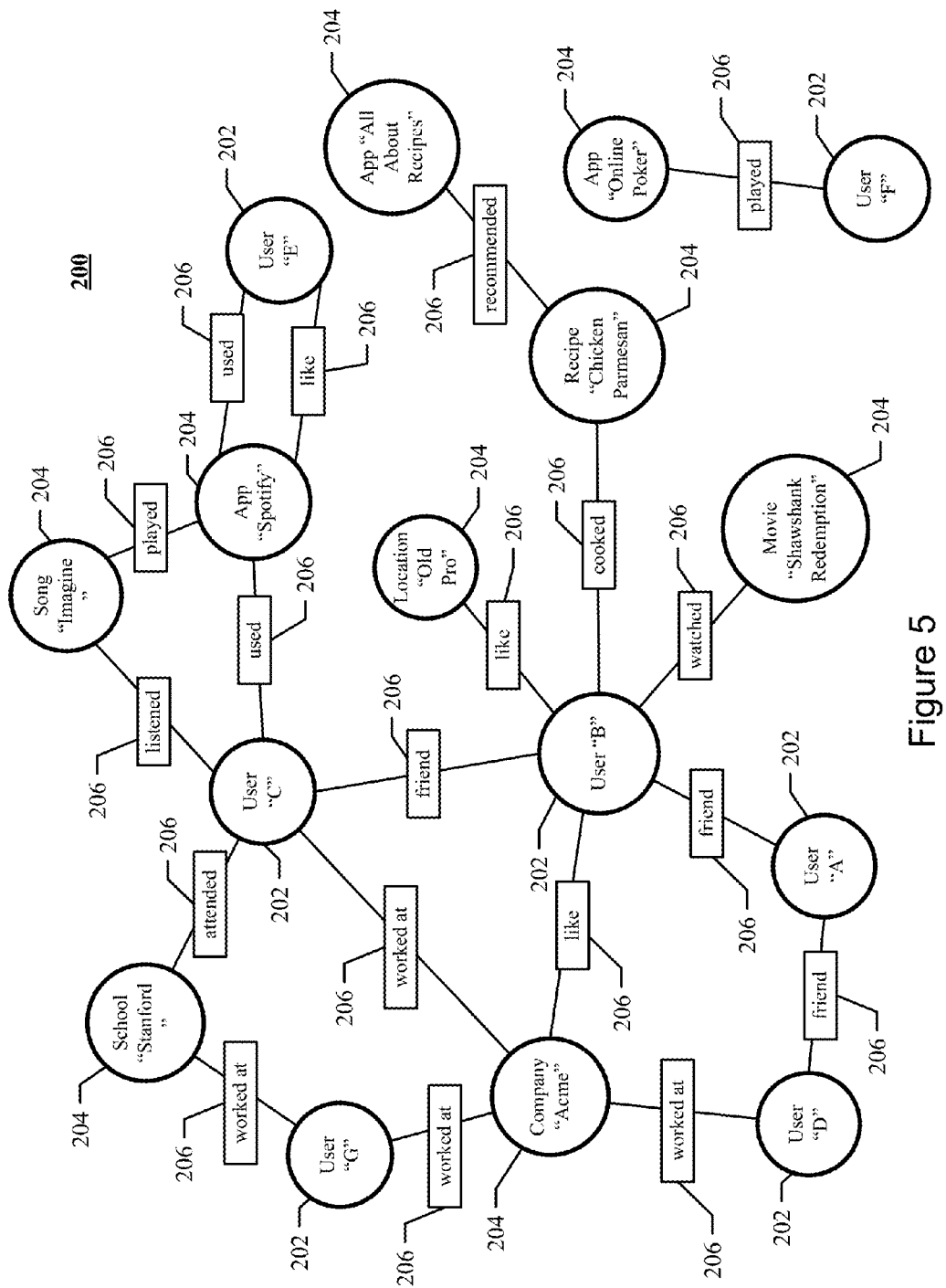
FIG. 5 illustrates an example social graph.

FIG. 5 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 5 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL);

contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 5, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 5) between user nodes 202 corresponding to the user and concept nodes 204 corresponding to the song and application to indicate that the user listened to the song and used the application. Moreover, social-networking system 160 may create a "played" edge 206 (as illustrated in FIG. 5) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 5 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 6:
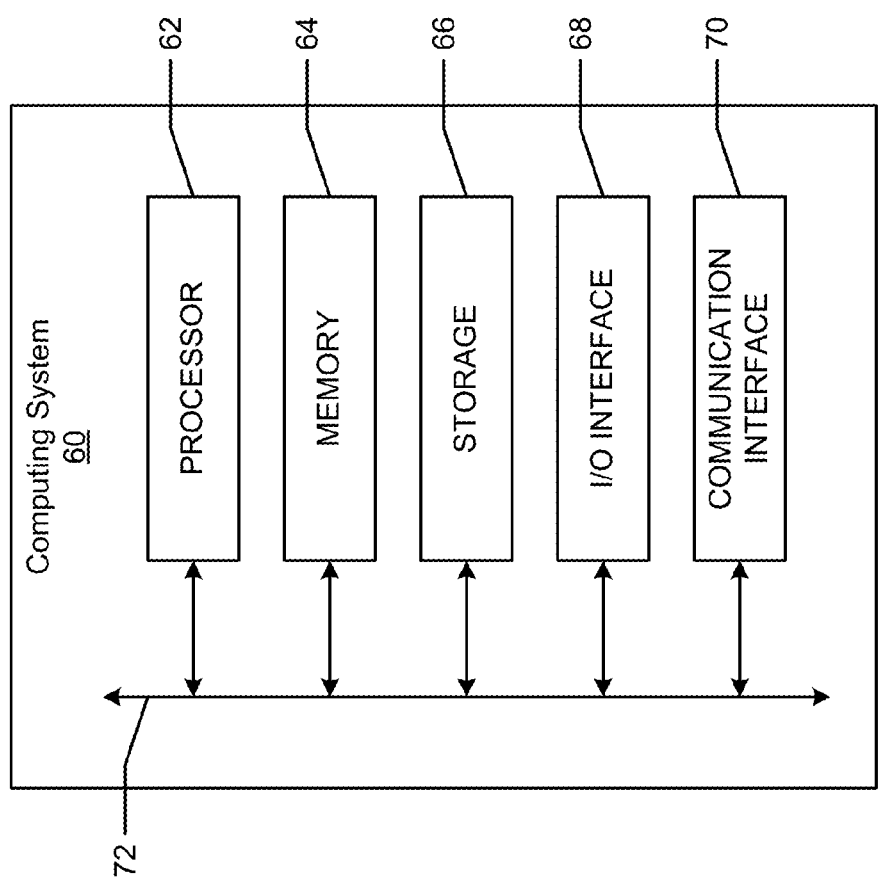
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, providing for presentation to a user a plurality of content objects, a first subset of the content objects being socially relevant to the user, a second subset of the content objects being socially irrelevant to the user;
    by the computing device, receiving input indicating a selection by the user of a plurality of the presented content objects;
    by the computing device, determining whether the presented content objects selected by the user are socially relevant or socially irrelevant to the user,
        wherein a content object selected by the user is socially relevant to the user if it is associated with a first node that is connected to at least one node corresponding to the user in a social graph,
        wherein a content object selected by the user is socially irrelevant to the user if it is associated with a second node that is not connected to at least one node corresponding to the user in the social graph, and
        wherein the first node is connected to the at least one node corresponding to the user in a social graph by an edge, the first node also connected to the at least one node corresponding to a concept, the first node corresponding to another user, the edge representing a social relationship between the other user and the user;
    by the computing device, authenticating the user if the presented content objects selected by the user are socially relevant to the user; and
    by the computing device, declining to authenticate the user if one or more of the presented content objects selected by the user is socially irrelevant to the user.

2. The method of claim 1, wherein the computing device is a client computing device.

3. The method of claim 1, wherein determining whether the presented content objects selected by the user are socially relevant to the user comprises:
    sending an indication of the selection by the user to a server computing device; and
    receiving from the server computing device an indication of whether the content objects selected by the user are socially relevant to the user.

4. The method of claim 1, wherein the presented content objects comprise:
    a name of another user;
    an image of the other user;
    a status update;
    a check-in location;
    a photo; or
    a video.

5. The method of claim 1, wherein authenticating the user comprises authenticating the user to the computing device.

6. One or more computer-readable non-transitory storage media embodying logic configured when executed to:
    provide for presentation to a user a plurality of content objects, a first subset of the content objects being socially relevant to the user, a second subset of the content objects not being socially irrelevant to the user;
    receive input indicating a selection by the user of a plurality of the presented content objects;
    determine whether the presented content objects selected by the user are socially relevant or socially irrelevant to the user,
        wherein a content object selected by the user is socially relevant to the user if it is associated with a first node that is connected to at least one node corresponding to the user in a social graph,
        wherein a content object selected by the user is socially irrelevant to the user if it is associated with a second node that is not connected to at least one node corresponding to the user in the social graph, and
        wherein the first node is connected to the at least one node corresponding to the user in a social graph by an edge, the first node also connected to the at least one node corresponding to a concept, the first node corresponding to another user, the edge representing a social relationship between the other user and the user;
    authenticate the user if the content objects selected by the user are socially relevant to the user; and
    decline to authenticate the user if one or more of the content objects selected by the user are socially irrelevant to the user.

7. The media of claim 6, wherein the logic is further configured to:
    send an indication of the selection by the user to a server computing device; and
    receive from the server computing device an indication of whether the content objects selected by the user are socially relevant to the user.

8. The media of claim 6, wherein the logic is further configured to present the plurality of content objects to the user on a display of a computing device.

9. The media of claim 6, wherein the content object comprises:
    a name of another user;
    an image of the other user;
    a status update;
    a check-in location;
    a photo; or
    a video.

10. The media of claim 6, wherein the logic is further configured to authenticate the user to a computing device.

11. A method comprising:
    by a server computing device, sending data to a client computing device corresponding to a plurality of content objects, a first subset of the content objects being socially relevant to a user, a second subset of the content objects being socially irrelevant to the user;
    by the server computing device, receiving input from the client computing device indicating a selection by the user of a plurality of the presented content objects; and
    by the server computing device, sending an indication to the client computing device of whether the presented content objects selected by the user are socially relevant to the user, the user being authenticated by the client computing device based at least in part on whether the content objects selected by the user are socially relevant to the user,
        wherein a content object selected by the user is socially relevant to the user if it is associated with a first node that is connected to at least one node corresponding to the user in a social graph,
        wherein a content object selected by the user is socially irrelevant to the user if it is associated with a second node that is not connected to at least one node corresponding to the user in the social graph, wherein the first node is connected to the at least one node corresponding to the user in a social graph by an edge, the first node also connected to the at least one node corresponding to a concept, the first node corresponding to another user, the edge representing a social relationship between the other user and the user.

12. The method of claim 11, further comprising selecting one or more content objects socially relevant to the user stored on a social-networking system based on social-graph information associated with the user.

13. The method of claim 11, wherein the content object comprises:

a name of another user;
an image of the other user;
a status update;
a check-in location;
a photo; or
a video.

14. The method of claim 11, wherein the client computing device is a mobile device.

15. The method of claim 1, wherein the computing device is a mobile device.

16. The media of claim 6, wherein the computing device is a mobile device.

* * * * *